May 27, 1941.    K. FRITZ    2,243,202
CIRCUIT FOR AUTOMATIC FREQUENCY CONTROL
Filed Sept. 14, 1938
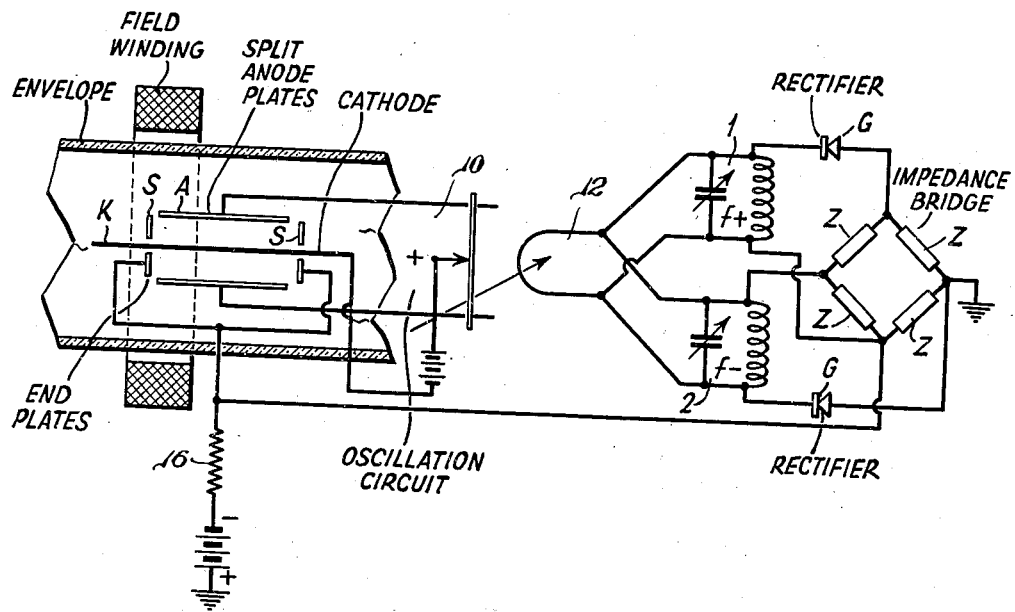
INVENTOR
KARL FRITZ
BY H.S.Srover
ATTORNEY Patented May 27, 1941

2,243,202

UNITED STATES PATENT OFFICE 2,243,202

CIRCUIT FOR AUTOMATIC FREQUENCY CONTROL

Karl Fritz, Berlin, Neubabelsberg, Germany, assignor to Telefunken Gesellschaft für Drahtlose Telegraphie m. b. H., Berlin, Germany, a corporation of Germany Application September 14, 1938, Serial No. 229,903
In Germany August 10, 1937

3 Claims. (Cl. 250—36)

For automatic frequency control of high frequency generators it is known to apply the generated frequency to a frequency discriminating member, e. g. to a resonant circuit or the like coupled to a rectifier, and to utilize the rectified voltage, for controlling the frequency of the generator. The most practical application of this idea is to impress the generated frequency on two resonant circuits one of which is tuned a little above and the other a little below the desired frequency of operation of the generator, to rectify the voltages of both resonant circuits, and combine the rectified components to obtain their difference and then use this difference voltage as the frequency control voltage. When long waves, that is low frequency waves, are generated, this frequency discrimination apparatus is arranged in a known manner in such a way that the magnetization of a core of a coil of the resonant circuit of the generator is varied by the control voltage or that a motor which serves for controlling the capacitance of a condenser of the resonant circuit is controlled as to direction of rotation by the control voltage.

The said well known method of frequency control is in accordance with this invention applied to a magnetron generator by impressing the control voltage on the end plates of a magnetron or other electrodes of the magnetron, the voltage of which will influence only the frequency of operation of the generator. The invention therefore is based on the utilization of properties which are characteristic of magnetrons. In the discharge space of magnetrons there are provided electrodes, variations in the bias of which vary the generated frequency only but not the amplitude of the oscillations produced. Those electrodes are e. g. the negative biased end plates of magnetron generators with slotted cylindrical anodes where oscillations of the second or greater order are being generated.

The invention is described in the single figure of the drawing. The figure shows in principle a magnetron generator with an anode A which possesses two or four slots, end plates S and a cathode K. The oscillations, which are generated in the tube and circuits comprising the sections of anode A and a loop 10 are induced from 10 into an inductance 12 connected with two tuned circuits 1 and 2, which are tuned above and below the generated frequency. Voltages from circuits 1 and 2 circuits are impressed on the rectifiers G, rectified therein and applied to the diagonals of a balanced bridge. From one branch of the bridge the resultant difference voltage is derived. This difference voltage is supplied by lead 14 to the impedance 16 in the direct current circuit of the end plates and superposed on the negative bias voltage of the end plates which are connected one another. A voltage amplifier may be connected between the rectifiers G and the bridge to obtain amplification of the voltages if desired.

Instead of using two separated short wave circuits 1 and 2, which preferably are made in form of the well known concentric line, it may be useful to utilize two long-wave circuits 1 and 2 and to reduce the generated frequency between the generator and the two circuits, e. g. by heterodyning. The principle of the arrangement remains the same, but the sensitivity will be increased.

This invention is not limited to the application of the control voltage to the negative biased end plate, because there are also other electrodes in the discharge space of magnetrons or near it, which have influence on frequency only. The special type for bias voltage of these electrodes depends on the employed type of tube.

I claim:

1. In a frequency control system for controlling the frequency of oscillation of a generator comprising a tube having an anode, a cathode and end plates located in a magnetic field with an oscillation circuit coupled to said anode and cathode, circuits tuned to frequencies above and below the frequency of the oscillations generated coupled to said oscillation circuit, a bridge circuit, rectifiers coupling said off tune circuits to said bridge circuit and means for applying potential from said bridge circuit to said end-plates of said tube to control its operating frequency in accordance with the nature of the applied potential.

2. In a wave generating and wave frequency stabilizing system, an electron discharge tube having a cathode, an anode at least partially surrounding said cathode, and an additional electrode at one end of said anode, means for producing a magnetic field in a direction transverse to the path of electron flow from said cathode to said anode, an oscillation circuit coupled to said anode and cathode, oscillations of a desired frequency being generated in said oscillation circuit when operating potentials are impressed between said anode and cathode, means coupled to said oscillation circuit for producing a potential which varies in accordance with variations of the frequency of the oscillations generated, and means for impressing said produced potential between said additional electrode and cathode in a sense to oppose or counteract said variations in the frequency of the oscillations generated.

3. In a wave generating and wave frequency stabilizing system, an electron discharge tube having a cathode, an anode at least partially surrounding said cathode and an end-plate electrode at each end of said anode, means for producing a magnetic field in a direction transverse to the path of electron flow from said cathode to said anode, an oscillation circuit, wherein oscillations of a desired frequency are generated when operating potentials are impressed between said anode and cathode, coupled to said anode and cathode, means including a rectifier coupled to said oscillation circuit for producing a potential which varies in accordance with variations of the frequency of the oscillations generated, and means for impressing said produced potential between the said end-plates and cathode in a sense to oppose or counteract said variations in the frequencies of the oscillations generated.

KARL FRITZ.